(12) United States Patent
Strock

(10) Patent No.: US 11,536,151 B2
(45) Date of Patent: Dec. 27, 2022

(54) PROCESS AND MATERIAL CONFIGURATION FOR MAKING HOT CORROSION RESISTANT HPC ABRASIVE BLADE TIPS

(71) Applicant: Raytheon Technologies Corporation, Farmington, CT (US)

(72) Inventor: Christopher W. Strock, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 146 days.

(21) Appl. No.: 16/857,261

(22) Filed: Apr. 24, 2020

(65) Prior Publication Data

US 2021/0332715 A1  Oct. 28, 2021

(51) Int. Cl.
*C23C 28/00* (2006.01)
*F01D 11/12* (2006.01)

(52) U.S. Cl.
CPC .......... *F01D 11/122* (2013.01); *C23C 28/324* (2013.01); *C23C 28/3215* (2013.01); *C23C 28/345* (2013.01); *F05D 2230/31* (2013.01); *F05D 2240/307* (2013.01)

(58) Field of Classification Search
CPC .. C23C 28/3215; C23C 28/324; C23C 28/345
See application file for complete search history.

(56) References Cited

U.S. PATENT DOCUMENTS

| | | |
|---|---|---|
| 4,610,698 A | 9/1986 | Eaton et al. |
| 4,680,199 A | 7/1987 | Vontell et al. |
| 4,689,242 A | 8/1987 | Pike |
| 4,741,973 A | 5/1988 | Condit et al. |
| 4,744,725 A | 5/1988 | Matarese et al. |
| 5,059,095 A | 10/1991 | Kushner et al. |
| 5,076,897 A * | 12/1991 | Wride ..................... C23C 10/02 205/110 |
| 5,453,329 A | 9/1995 | Everett et al. |

(Continued)

FOREIGN PATENT DOCUMENTS

| | | |
|---|---|---|
| DE | 102006016995 A1 | 10/2007 |
| EP | 0573928 A1 | 12/1993 |

(Continued)

OTHER PUBLICATIONS

EP Search Report dated Sep. 27, 2021 issued for corresponding European Patent Application No. 21169973.1.

(Continued)

*Primary Examiner* — Tabatha L Penny
(74) *Attorney, Agent, or Firm* — Bachman & LaPointe, P.C.

(57) ABSTRACT

An abrasive coating system for a substrate of an airfoil in a turbine engine high pressure compressor, comprising a plurality of grit particles adapted to be placed on a top surface of the substrate; a matrix material bonded to the top surface; the matrix material partially surrounds the grit particles, the matrix material consisting of unalloyed chromium and unalloyed aluminum distributed throughout the matrix material, wherein the grit particles extend above the matrix material relative to the top surface; and a film of oxidant resistant coating applied over the plurality of grit particles and the matrix material.

12 Claims, 4 Drawing Sheets

(56) References Cited

U.S. PATENT DOCUMENTS

| | | |
|---|---|---|
| 5,932,356 A | 8/1999 | Sileo et al. |
| 5,935,407 A * | 8/1999 | Nenov ................... C23C 28/00 |
| | | 205/228 |
| 5,952,110 A | 9/1999 | Schell et al. |
| 6,057,047 A | 5/2000 | Maloney |
| 6,190,124 B1 | 2/2001 | Freling et al. |
| 6,194,086 B1 | 2/2001 | Nenov et al. |
| 6,468,040 B1 | 10/2002 | Grylls et al. |
| 6,532,657 B1 | 3/2003 | Weimer et al. |
| 6,833,203 B2 | 12/2004 | Bose et al. |
| 7,510,370 B2 | 3/2009 | Strangman et al. |
| 7,718,280 B2 | 5/2010 | Wilson |
| 7,763,367 B2 | 7/2010 | Arndt et al. |
| 9,713,912 B2 | 7/2017 | Lee |
| 9,957,826 B2 | 5/2018 | Novikov et al. |
| 10,259,720 B2 | 4/2019 | Balbach et al. |
| 10,927,685 B2 | 2/2021 | Seymour et al. |
| 2003/0008764 A1 | 1/2003 | Wang et al. |
| 2004/0023020 A1 | 2/2004 | Bose et al. |
| 2004/0208749 A1 | 10/2004 | Torigoe et al. |
| 2005/0035086 A1 | 2/2005 | Chen et al. |
| 2007/0099011 A1 | 5/2007 | Wilson |
| 2008/0166225 A1 | 7/2008 | Strangman et al. |
| 2009/0311552 A1 | 12/2009 | Manier et al. |
| 2012/0099972 A1 | 4/2012 | Guo et al. |
| 2013/0149163 A1 | 6/2013 | Parkos, Jr. et al. |
| 2013/0154194 A1 | 6/2013 | Van Saun |
| 2015/0118060 A1 | 4/2015 | Kumar et al. |
| 2015/0354397 A1 | 12/2015 | Novikov et al. |
| 2016/0069184 A1 | 3/2016 | Ribic et al. |
| 2016/0069195 A1 | 3/2016 | Hewitt et al. |
| 2016/0160661 A1 | 6/2016 | Balbach et al. |
| 2016/0199930 A1 | 7/2016 | Yarbrough |
| 2016/0341051 A1 | 11/2016 | Hewitt et al. |
| 2018/0347390 A1 | 12/2018 | Wilson et al. |
| 2019/0136701 A1 | 5/2019 | Wusatowska-Sarnek |
| 2020/0024971 A1 | 1/2020 | Seymour et al. |
| 2020/0024975 A1 * | 1/2020 | Strock ...................... C23C 4/02 |
| 2020/0025016 A1 | 1/2020 | Seymour et al. |

FOREIGN PATENT DOCUMENTS

| | | | |
|---|---|---|---|
| EP | 1408197 A1 | 4/2004 | |
| EP | 2011901 A1 | 1/2009 | |
| EP | 3056679 A1 | 8/2016 | |
| EP | 3088559 A1 | 11/2016 | |
| EP | 3239465 A1 | 11/2017 | |
| EP | 3480428 A2 * | 5/2019 | ............ C25D 15/00 |
| EP | 34800428 A2 | 5/2019 | |
| EP | 3597860 A1 * | 1/2020 | ............ B32B 15/20 |
| EP | 3597860 A1 | 1/2020 | |
| GB | 2529854 A | 3/2016 | |
| WO | 2007115551 A1 | 10/2007 | |

OTHER PUBLICATIONS

European Search Report dated Mar. 31, 2020 issued for corresponding European Patent Application No. 19185794.5.

European Search Report dated Dec. 18, 2019 issued for corresponding European Patent Application No. 19187387.6.

European Search Report dated Apr. 1, 2020 issued for corresponding European Patent Application No. 19185773.9.

U.S. Office Action dated Nov. 18, 2019 for corresponding U.S. Appl. No. 16/039,907.

U.S. Non-Final Office Action dated Mar. 12, 2020 for corresponding U.S. Appl. No. 16/039,909.

U.S. Final Office Action dated Jun. 3, 2020 for corresponding U.S. Appl. No. 16/039,907.

* cited by examiner

PROCESS AND MATERIAL CONFIGURATION FOR MAKING HOT CORROSION RESISTANT HPC ABRASIVE BLADE TIPS

BACKGROUND

The present disclosure is directed to a coating layer configuration that will provide oxidation resistance to high pressure compressor blade tips and blade tip abrasives. A thin film coating is applied at the blade tip over an unalloyed matrix material with abrasive particles forming an abrasive coating.

Gas turbine engines and other turbomachines have rows of rotating blades and static vanes or knife-edge seals within a generally cylindrical case. To maximize engine efficiency, the leakage of the gas or other working fluid around the blade tips should be minimized. This may be achieved by designing sealing systems in which the tips rub against an abradable seal. Generally, the tip is made to be harder and more abrasive than the seal; thus, the tips will abrade or cut into the abradable seal during those portions of the engine operating cycle when they come into contact with each other.

During the operation of a gas turbine engine, it is desired to maintain minimum clearance between the tips and corresponding abradable seals as a large gap results in decreased efficiency of the turbine, due to the escape of high-energy gases. However, a small gap may increase the frequency of interaction between the tips and seal. That in turn, due to the friction between the tips and seals, will lead to excessive component wear and efficiency reduction or even component distress. Since aircraft turbines experience cyclic mechanical and thermal load variations during operation, their geometry varies during the different stages of the operating cycle. Passive and active clearance control and abrasive tips paired with abradables are currently used to establish and maintain optimum clearance during operation. Ideally, those tips should retain their cutting capability over many operating cycles compensating for any progressive changes in turbine geometry.

The metal matrix and/or abrasive grit in a compressor blade tip abrasive coating are prone to oxidation and/or corrosion due to normal engine operation and adverse environmental conditions. This oxidation/corrosion can lead to decreased cutting performance of the abrasive tip system against an abradable coating leading to blade damage and decrease engine performance over time. What is needed is a stop gap coating which can be applied over the blade tip abrasive coating to improve the oxidation/corrosion resistance of the abrasive coating system prior to the time that the constituents of the matrix have fully diffused to alloy and become self-protecting.

SUMMARY

In accordance with the present disclosure, there is provided an abrasive coating system for a substrate of an airfoil in a turbine engine high pressure compressor, comprising a plurality of grit particles adapted to be placed on a top surface of the substrate; a non-diffused matrix material bonded to the top surface; the non-diffused matrix material partially surrounds the grit particles, the non-diffused matrix material comprising plated material and concentrated alloying elements distributed throughout the non-diffused matrix material, wherein the grit particles extend above the non-diffused matrix material relative to the top surface; and a film of oxidant resistant coating applied over the plurality of grit particles and the non-diffused matrix material.

A further embodiment of any of the foregoing embodiments may additionally and/or alternatively include the film of oxidant resistant coating comprises an oxide coating.

A further embodiment of any of the foregoing embodiments may additionally and/or alternatively include the oxide is selected from the group consisting of alumina, chromia and a mixture of alumina and chromia.

A further embodiment of any of the foregoing embodiments may additionally and/or alternatively include the film of oxidant resistant coating is selected from the group consisting of an aluminum oxide, a nitride coating, a titanium aluminum nitride, a zirconium oxide, a mixture of aluminum and zirconium oxide, zirconium toughened aluminum oxide.

A further embodiment of any of the foregoing embodiments may additionally and/or alternatively include the film of oxidant resistant coating comprises an oxide former.

A further embodiment of any of the foregoing embodiments may additionally and/or alternatively include the non-diffused matrix material comprises a matrix formed from at least one of Ni, Co and MCrAlY, wherein M is Ni or Co, pure Ni and a cobalt chrome carbide material.

A further embodiment of any of the foregoing embodiments may additionally and/or alternatively include the plated material and concentrated alloying elements distributed throughout the non-diffused matrix material are configured to diffuse within the non-diffused matrix forming chromium and aluminum alloy within a diffused matrix material responsive to exposing said airfoil to an operating temperature of the turbine engine high pressure compressor.

In accordance with the present disclosure, there is provided a process for coating a turbine engine high pressure compressor airfoil with an abrasive, the process comprising applying an adhesion layer onto a tip of the airfoil; adhering a plurality of grit particles to the adhesion layer, wherein spaces are formed between the grit particles; applying a non-diffused matrix material to the adhesion layer and connecting to the grit particles, the non-diffused matrix material comprising plated material and concentrated alloying elements distributed throughout the non-diffused matrix material; applying a film of oxidant resistant coating over the plurality of grit particles and the non-diffused matrix material; exposing the airfoil to an operating temperature of at least 1000 degrees Fahrenheit; diffusing the plated material and the concentrated alloying elements within a diffused matrix material; and forming an alloy of the plated material and the concentrated alloying elements within the diffused matrix material.

A further embodiment of any of the foregoing embodiments may additionally and/or alternatively include the film of oxidant resistant coating is selected from the group consisting of an aluminum oxide, a nitride coating, a titanium aluminum nitride, a titanium aluminum carbide, a zirconium oxide and mixtures thereof.

A further embodiment of any of the foregoing embodiments may additionally and/or alternatively include the plated material comprises a nickel, a cobalt or a copper.

A further embodiment of any of the foregoing embodiments may additionally and/or alternatively include the concentrated alloying elements comprises unalloyed chromium and unalloyed aluminum.

A further embodiment of any of the foregoing embodiments may additionally and/or alternatively include the process further comprising depositing the film of oxidant resistant coating as an oxide coating.

A further embodiment of any of the foregoing embodiments may additionally and/or alternatively include the oxide is selected from the group consisting of alumina, chromia and a mixture of alumina and chromia.

A further embodiment of any of the foregoing embodiments may additionally and/or alternatively include the oxide comprises an aluminum plating or a chrome plating of less than 0.0005 inches thick.

A further embodiment of any of the foregoing embodiments may additionally and/or alternatively include the oxide comprises an aluminum plating or a chrome plating of from 0.0001 to 0.0003 inches thick.

A further embodiment of any of the foregoing embodiments may additionally and/or alternatively include the oxide comprises an aluminum rich coating or a chromium rich coating.

A further embodiment of any of the foregoing embodiments may additionally and/or alternatively include the oxide comprises a paint including an equivalent amount of the Al or Cr.

A further embodiment of any of the foregoing embodiments may additionally and/or alternatively include the film of oxidant resistant coating comprises an oxide former.

A further embodiment of any of the foregoing embodiments may additionally and/or alternatively include the exposing step and the diffusing step and forming step are performed in an atmosphere having oxygen.

Other details of the coating system are set forth in the following detailed description and the accompanying drawings wherein like reference numerals depict like elements.

DETAILED DESCRIPTION

Figure 1:
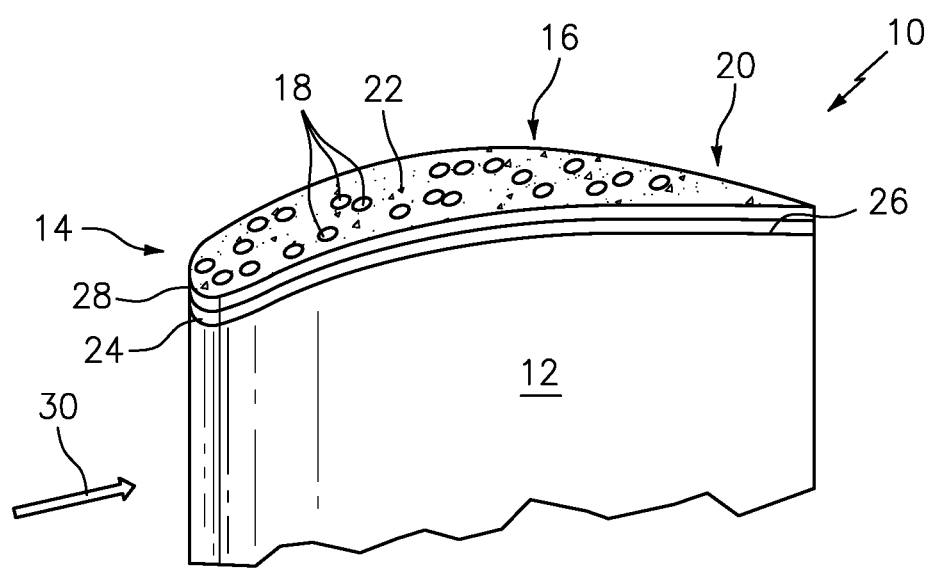
FIG. 1 is a schematic representation of abrasive composite coating applied to a tip of a turbine engine component according to the disclosure.

Referring now to FIG. 1 there is illustrated a turbine engine component 10, such as a gas turbine blade including but not limiting to high pressure compressor airfoils. The turbine blade 10 has an airfoil portion 12 with a tip 14. The tip 14 has an abrasive coating 16 applied to it. The abrasive coating 16 comprises a corrosion resistant composite material. The abrasive coating includes an abrasive particulate/grit or first grit, simply grit 18, such as cubic boron nitride (CBN), coated silicon carbide (SiC), metal borides, hafnia, zirconia, rare earth stabilized or partially stabilized yttria or another hard ceramic phase.

The grit 18 can be sized as a coarse grit. In an exemplary embodiment the grit 18 can be sized from about 10 to about 500 microns. The first grit 18 is embedded in a composite matrix layer or simply non-diffused matrix layer 20. The non-diffused matrix layer 20 comprises a suitable oxidation-resistant alloy matrix. In an exemplary embodiment the first grit 18 can extend above the non-diffused matrix material 20 relative to the tip 14 or the first grit particles can be flush with the matrix material relative to said tip or the first grit particles can be below the matrix material relative to the tip; and combinations thereof.

In an exemplary embodiment the non-diffused matrix layer 20 comprises a matrix formed from Cu, Ni or Co or mixtures thereof. The diffused matrix, that is, matrix post diffusion, can include a matrix alloy that can have any MCrAl composition such as Ni20Cr12A1. Additives such as Hf, Si and Y may be present at levels of about 0.4% up to 2 wt % to promote adhesion of a protective thermally grown oxide 28. The particle size of the alloying additives may be 10 microns to 150 microns, or more preferably 10 to 60 microns or most desirably from 20 to 40 microns D50 size where the D50 size represents the size at which 50 wt % is larger or smaller. In an exemplary embodiment, the non-diffused matrix layer 20 can comprise pure nickel, nickel alloy, copper, copper alloy, cobalt, cobalt alloy, aluminum, chrome, a nickel chrome carbide, a cobalt chrome carbide material or other alloys.

The resulting blade tip 14 with abrasive coating 16 is particularly well suited for rubbing metal as well as ceramic abradable seals (not shown).

Figure 2A:
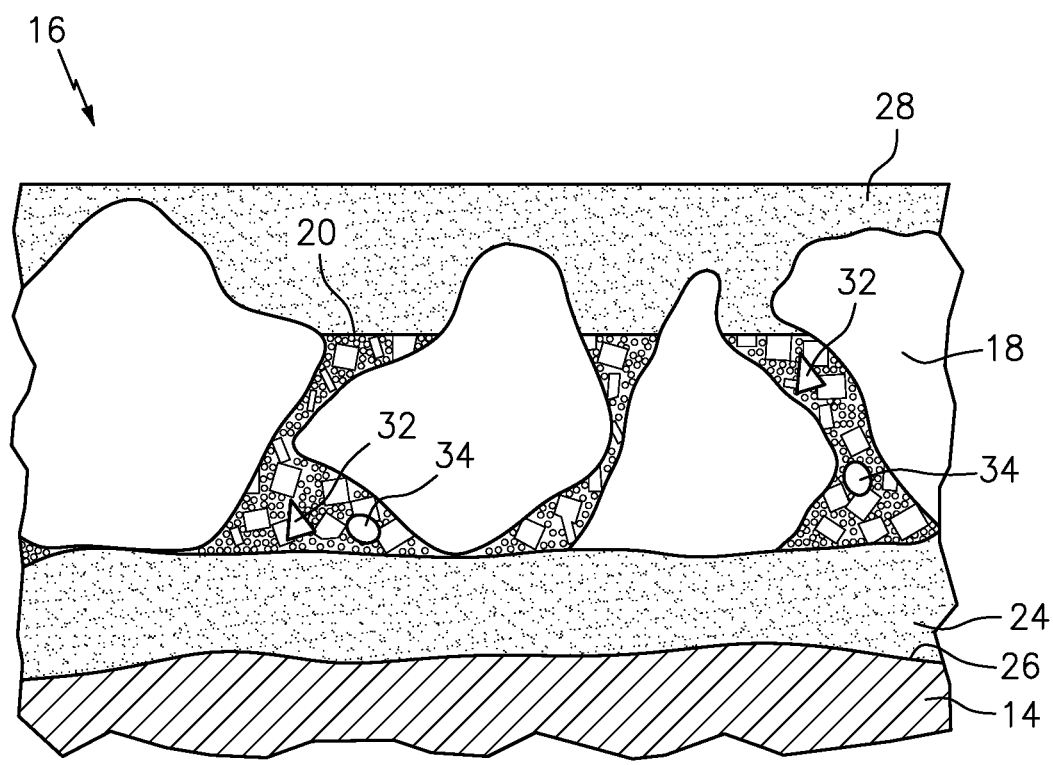
FIGS. 2a-b are schematic cross-sectional views of the exemplary abrasive blade tip coating at different times.

Referring to FIG. 2a an exemplary abrasive coating 16 is shown. The abrasive coating 16 includes the large first grit 18.

The abrasive coating 16 can include an adhesion layer or simply a base layer 24 bonded to a top surface 26 of the blade tip 14. The adhesion layer 24 is configured to adhere the grit particles to the top surface 26. The adhesion layer 24 can be the same material as the matrix layer 20. The adhesion layer 24 can be from about 1 to about 100 microns in thickness. In an exemplary embodiment, the adhesion layer 24 can be from about 5 to about 50 microns in thickness. The adhesion layer 24 can be optionally applied, so that the non-diffused matrix layer 20 is bonded to the top surface 26 of the tip 14.

In an exemplary embodiment the first grit particles 18 extend above the matrix material 20 relative to the top surface 26. In an exemplary embodiment the first grit particles 18 are flush with the matrix material 20 relative to the top surface 26.

A film of oxidant resistant coating 28 can be applied over the grit particles 18 and the non-diffused matrix material 20 (shown exaggerated for demonstration purposes). The film of oxidant resistant coating 28 can comprise an oxide coating or other coating that protects the non-diffused matrix material 20, such as a thin film coating of aluminum, gold, platinum, and the like. The oxidant resistant coating 28 can include PVD, CVD, sputter deposited single phase layers or a multiphase layer such as aluminum flake in a solvent suspension with silica or alumina sol or sol gel as a binder that either itself forms an oxidation resistant layer or oxidizes to form an oxygen barrier. In an exemplary embodiment, the film of oxidant resistant coating 28 can be selected from the group consisting of an aluminum oxide, a nitride coating and a titanium aluminum nitride, a zirconium oxide, a mixture of aluminum and zirconium oxide, and the like. The film of oxidant resistant coating 28 has a thickness from 1 micron to 50 microns. The film for the oxide and nitride barrier coatings, ranges can be from 1 micron to 10 microns or from 1 micron to 5 microns. The film of oxidant resistant coating 28 is configured to protect the non-diffused matrix material 20 from oxidation/corrosion by acting as a barrier for oxygen diffusion to the non-diffused matrix layer 20 and/or grit 18 of the abrasive coating 16. The film of oxidant resistant coating 28 can also prevent corrosive species from coming into contact with the abrasive coating 16. In an exemplary embodiment, the film of oxidant resistant coating 28 can be an oxide coating. In an exemplary embodiment, oxide is selected from the group consisting of alumina, chromia and a mixture of alumina and chromia. In an exemplary embodiment, the oxide comprises an aluminum plating or a chrome plating of less than 0.0005 inches thick. In an exemplary embodiment, the oxide comprises an aluminum plating or a chrome plating of from 0.0001 to 0.0003 inches thick. In an exemplary embodiment, the oxide comprises an aluminum rich coating or a chromium rich coating. In an exemplary embodiment, the oxide comprises a paint including an equivalent amount of the Al or Cr. In an exemplary embodiment, the coating 28 can comprise an oxide that comprises 0.0002 inches worth of Al present at 50 vol. % in a dried or cured layer of paint that is 0.0004" thick.

Figure 2B:
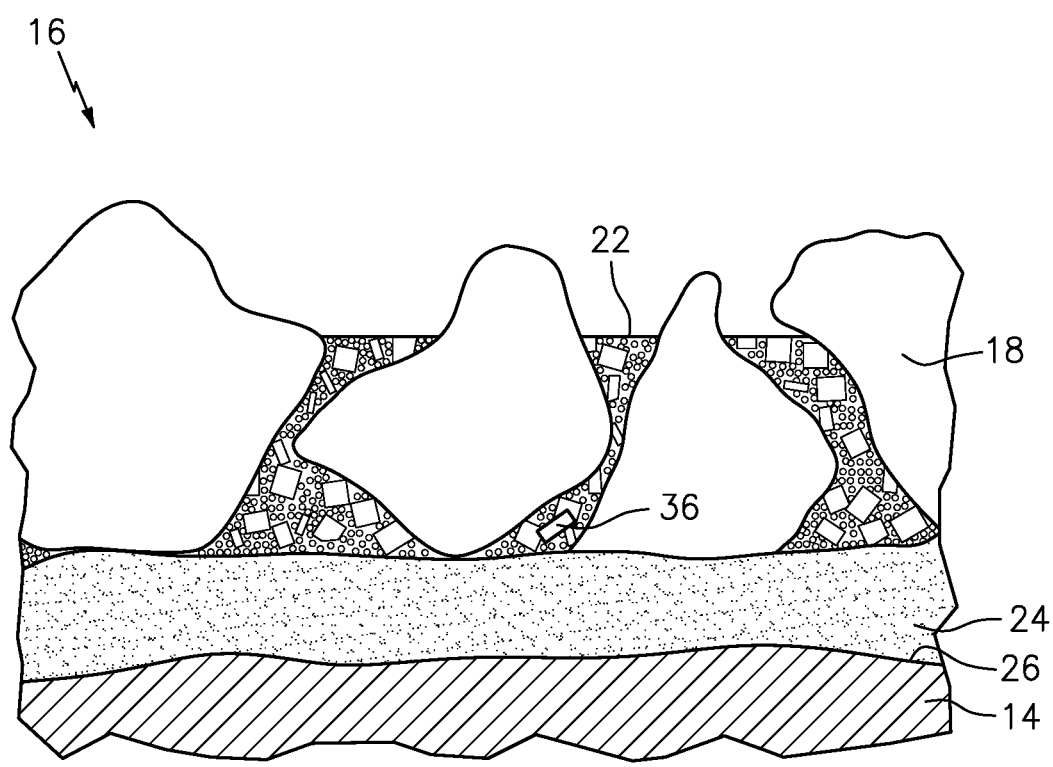

Referring also to FIG. 2*b*, the disclosed process utilizes the film of oxidant resistant coating 28 to prevent the gross oxidation of the underlying non-diffused matrix material 20 until a time and a temperature combination of when the constituents of the diffused matrix material 22 have diffused into the plated material enough to alloy 36 and become self-protecting from excessive oxidation by forming its own protective aluminum and/or chrome oxide layer. The oxidant resistant coating 28 is no longer shown at FIG. 2*b*, illustrating the temporary nature of the oxidant resistant coating 28 in the exemplary process disclosed. The alloy 36 is shown since the constituents of the non-diffused matrix material 20, including plated materials 32, such as nickel, or cobalt or copper and alloy rich particles and concentrated alloying elements 34, such as chromium and aluminum (not shown at FIG. 2*b*) have had time to diffuse and alloy 36 in the absence of a protected atmosphere, that is exposed to oxygen. In an exemplary embodiment, the time period can be on the order of a few hours at gas turbine engine operating temperature proximate the high pressure compressor, for example one hour at a temperature above 1100 degrees Fahrenheit or more broadly from about 1000 degrees Fahrenheit to about 1600 degrees Fahrenheit.

The component 10 can include a component in a gas path 30 exposed to a temperature range of 700 degrees Centigrade to 1600 degrees Centigrade. In an exemplary embodiment the component can be a high pressure compressor, and the like. In some cases the component may be used in the hot section of a turbine engine such as the power turbine. The component 10 may be an airfoil, knife edge seal, plate seal or the like.

Figure 3:
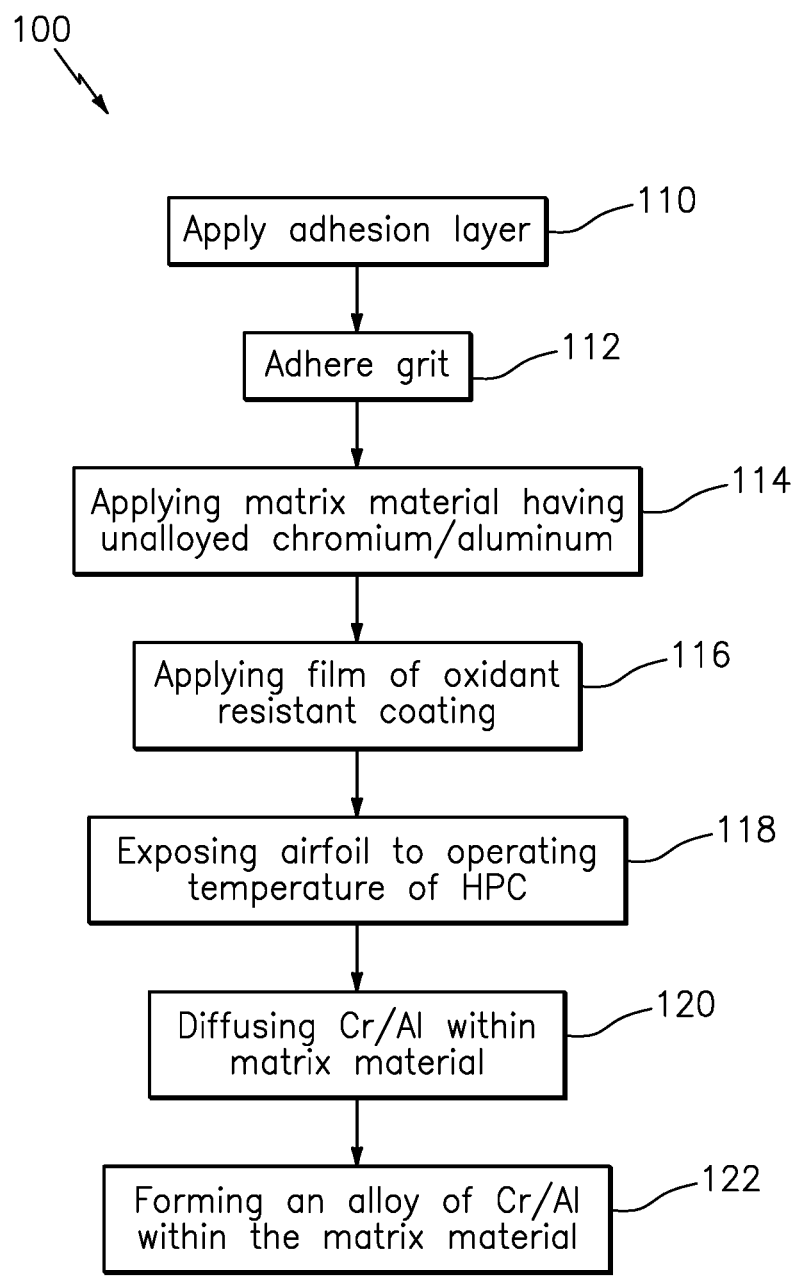
FIG. 3 is a process map of the disclosed exemplary process.

Referring also to FIG. 3, the disclosed process 100. At step 110, the process can include applying an adhesion layer 24 onto the top surface 26 of the tip 14 of the airfoil 12. At step 112 the process can include adhering the plurality of grit particles 18 to the adhesion layer 24, spaces can be formed between the grit particles 18. At step 114, the process can include applying the non-diffused matrix material 20 to the adhesion layer 24 and connecting to the grit particles 18, the non-diffused matrix material 20 can consist of plated materials 32, such as nickel, or cobalt or copper, and alloy rich particles and concentrated alloying elements 34, including unalloyed chromium and unalloyed aluminum distributed throughout the non-diffused matrix material 20. At step 116, the process can include applying the film of oxidant resistant coating 28 over the plurality of grit particles 18 and the non-diffused matrix material 20. At step 118, the process can include exposing the airfoil to a temperature of 1000 degrees Fahrenheit or higher, such as an operating temperature of the turbine engine high pressure compressor 10. At step 120, the process can include diffusing the plated materials 32, such as nickel, or cobalt or copper and alloy rich particles and concentrated alloying elements 34 within the non-diffused matrix material 20. At step 122, the process can include forming an alloy 36 of the plated materials 32, such as nickel, or cobalt or copper and the alloy rich particles and concentrated alloying elements 34, including unalloyed chromium and unalloyed aluminum within the diffused matrix material 22. In an exemplary embodiment, the oxide is selected from the group consisting of alumina, chromia and a mixture of alumina and chromia. The steps above can be performed in an oxygen atmosphere.

The process disclosed forgoes the use of a diffusion heat treatment of the component 10 during manufacture. Instead the component 10 can be installed into the gas turbine engine and during the break-in operation of the gas turbine engine, the chromium and the aluminum can be diffused and alloy while being subjected to the high temperature environment within the high pressure compressor. The film oxidant resistant coating 28 does not need to have high durability, since the protective properties, and resistance to oxidation needs to last long enough for the constituents of the matrix 20 to have diffused enough to form alloys to become self-protecting from the oxidation.

A technical advantage of the disclosed process and coating includes a cost reduction by elimination of the manufacturing heat treatment step.

Another technical advantage of the disclosed process and coating system includes a durability improvement over non-heat treated abrasive tips.

Another technical advantage of the disclosed process and coating system includes the oxidation protection from the film oxidant resistant coating for the abrasive blade tip matrix for a time duration long enough that the protective TGO forming species in the matrix can diffuse sufficiently to start forming an adherent protective oxide layer within the matrix.

There has been provided a coating system. While the coating system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process for coating a turbine engine compressor airfoil with an abrasive, said process comprising:
   applying an adhesion layer onto a tip of the airfoil;
   adhering a plurality of grit particles to said adhesion layer, wherein spaces are formed between said grit particles;
   applying a non-diffused matrix material to said adhesion layer and connecting to said grit particles, said non-diffused matrix material comprising plated material and alloying elements distributed throughout the non-diffused matrix material;
   applying a film of oxidant resistant coating over said plurality of grit particles and said non-diffused matrix material;
   exposing said airfoil to an operating temperature of at least 1000 degrees Fahrenheit;
   diffusing the plated material and the alloying elements within a diffused matrix material; and
   forming an alloy of the plated material and the alloying elements within the diffused matrix material.

2. The process of claim 1, wherein said film of oxidant resistant coating is selected from the group consisting of an aluminum oxide, a nitride coating, a titanium aluminum nitride, a titanium aluminum carbide, a zirconium oxide and mixtures thereof.

3. The process of claim 1, wherein said plated material comprises a nickel, a cobalt or a copper.

4. The process of claim 1, wherein said alloying elements comprises unalloyed chromium and unalloyed aluminum.

5. The process of claim 1, further comprising:
depositing said film of oxidant resistant coating as an oxide coating.

6. The process of claim 5, wherein said oxide is selected from the group consisting of alumina, chromia and a mixture of alumina and chromia.

7. The process of claim 5, wherein said oxide comprises plating of less than 0.0005 inches thick.

8. The process of claim 5 wherein said oxide comprises plating of from 0.0001 to 0.0003 inches thick.

9. The process of claim 5 wherein said oxide comprises an aluminum rich coating or a chromium rich coating.

10. The process of claim 5 wherein said oxide comprises Al or Cr.

11. The process of claim 1, wherein said film of oxidant resistant coating comprises an oxide former.

12. The process of claim 1 wherein said exposing step and said diffusing step and forming step are performed in an atmosphere having oxygen.

\* \* \* \* \*